(12) United States Patent
Richards

(10) Patent No.: US 6,357,264 B1
(45) Date of Patent: Mar. 19, 2002

(54) APPARATUS FOR MELTING MOLTEN MATERIAL

(75) Inventor: Raymond S. Richards, 8050 Holstein Rd., Toledo, OH (US) 43635-2393

(73) Assignee: Raymond S. Richards, Toledo, OH (US)

(*) Notice: Subject to any disclaimer, the term of this patent is extended or adjusted under 35 U.S.C. 154(b) by 0 days.

(21) Appl. No.: 09/580,708

(22) Filed: May 30, 2000

Related U.S. Application Data

(62) Division of application No. 08/924,252, filed on Sep. 5, 1997, now Pat. No. 6,109,062.
(60) Provisional application No. 60/027,413, filed on Oct. 8, 1996.

(51) Int. Cl.$^7$ ................................................. C03B 5/18
(52) U.S. Cl. ..................... 65/135.2; 65/134.4; 65/135.1; 65/135.7; 65/135.9; 65/136.1; 65/136.2; 65/136.3; 65/335; 65/346; 65/347; 65/337; 65/336; 65/355; 65/356; 266/217; 266/233; 266/235; 266/900; 432/120; 432/159; 432/195
(58) Field of Search .............................. 65/134.4, 135.1, 65/135.2, 135.7, 135.9, 136.1, 136.2, 136.3, 335, 346, 347, 337, 336, 355, 356; 266/217, 233, 235, 900; 432/120, 159, 195

(56) References Cited

U.S. PATENT DOCUMENTS

| 3,237,929 A | | 3/1966 | Plumat et al. |
|---|---|---|---|
| 3,260,587 A | * | 7/1966 | Dolf et al. |
| 3,350,187 A | * | 10/1967 | Brichard et al. |
| 3,945,820 A | * | 3/1976 | Brotzman et al. |
| 4,327,901 A | * | 5/1982 | Kaiser |
| 4,622,007 A | | 11/1986 | Gitman |
| 5,630,713 A | | 5/1997 | Shver et al. |
| 5,662,725 A | * | 9/1997 | Cooper |

* cited by examiner

Primary Examiner—Michael Colaianni
(74) Attorney, Agent, or Firm—Emch, Schaffer, Schaub & Porcello Co., L.P.A.

(57) ABSTRACT

This apparatus is a furnace for heating molten material which employs oxygen-fuel burner assemblies. Preferably, the assemblies are submerged in the molten material. They are water cooled top down units with burner nozzles being off-set from the supply column. The apparatus utilizes one or more burners for each top down supply column. The supply column and attached burners can be rotated or moved in a manner to avoid the open chimney effect seen with fixed air-fuel burners of the prior art. These burners with an off-set nozzle like the letter L are rotated at high speed or oscillated to distribute the combustion in the form of gas bubbles or a gas curtain. In another embodiment, the oxy-fuel burners are not submerged. The nozzles are aimed at unmelted batch or the upper surface of the molten material for controlled splashing.

25 Claims, 6 Drawing Sheets

APPARATUS FOR MELTING MOLTEN MATERIAL

This patent application is a divisional of patent application Ser. No. 08/924,252 filed Sep. 5, 1997, now U.S. Pat. No. 6,109,062 issued Aug. 29, 2000, which claims the benefit of provisional patent application Ser. No. 60/027,413 filed Oct. 8, 1996.

TECHNICAL FIELD

This invention relates to the melting of materials. More specifically, the invention relates to the melting of glassy materials with oxy-fuel burners.

BACKGROUND OF THE INVENTION

The glass industry has utilized air-fuel burners to melt glass and glassy like materials over the years. The developed processes included the use of submerged air-fuel combustion burners. These burners were located in the bottom or side wall of the furnace below the melt line. The advantages looked for in submerged combustion were increased heat transfer from the flame and the avoidance of high flame temperatures on the crown of the furnace.

In operation, the high volumes of air-gas resulted in open tunnels or chimneys up through the glass. The unstable nature of these "chimneys" resulted in their partial collapse or blockage with molten glass. The high volume of combustion gases from the vertical bottom entering burners and the parallel side entering burners result in rapid expulsion of gobs of glass in all directions. Some additional disadvantages observed included difficult maintenance of the burners, splashing of the glass over the crown with subsequent attack, a dirty off gas stream, difficult recuperation, and a very noisy operation.

While these early attempts focused on the flame temperature-heat transfer opportunity, they apparently failed to take into account the local effects of the heat transfer and the rather high kinetic energy of the flame and its transfer to the glass on the refractory structure and the fluid flow pattern of the melt volume. These localized effects resulted in very hot refractories adjacent to the burners as well as significant "washing-out" of the refractories due to the high velocity of the glass in this same area. Some of those disadvantages result from using stationary burners in the vertical position. In the bottom location, the high kinetic energy of the combustion stream results in ejection of glass at high velocity all over the furnace crown.

In the prior art process, all of the required melting heat was supplied through the submerged burners.

DISCLOSURE OF THE INVENTION

This invention employs assemblies which include burners that use oxygen-fuel (oxy-fuel). The burners are water cooled top down units with burner nozzles being positioned in such away so as to maximize transfer of heat and kinetic energy from the combustion stream to the glass and utilizing this transferred kinetic energy, without the deleterious effects of the earlier efforts. Preferably, I submerge the burners in the molten material. However, in one embodiment, the burners are slightly above the molten material. The apparatus of this invention utilizes one or more burners for each top-down supply column. The supply column and attached burners can be rotated or moved in a manner to avoid the open chimney effect seen with stationary air-fuel burners of the prior art.

The mass flow rate to be used in these burners has, as a minimum, that required to stir the glass effectively. When it is desirable to minimize glass explusion, the maximum desirable flow rate is just below that which creates open tunnels or chimneys in the molten glass. This maximum flow rate can be greatly increased by the mechanical motion of the nozzle. Further, the mechanical movement of the burner nozzle extends and attenuates the hot gas path in the melt. This increases contact time and surface area for improved heat transfer. The movement also allows the glass to absorb more of the kinetic energy. All additional heat is made up from top fired burners.

These assemblies with an off-set nozzle like the letter L can be rotated at high speed to distribute the combustion in the form of gas bubbles or a gas curtain. In all applications, the high kinetic energy of the combustion stream coupled with the angle of the supply arm and the offset angle of the nozzle is utilized to induce favorable rapid flow of the melted glass. The combustion and subsequent glass flow are directed to avoid immediate impingement on the refractory structure of the furnace. The top down burners can be easily adjusted in depth for maximum effect, removed for repair, and started easily by firing above the batch until it melts and then lowering them down.

BEST MODE OF CARRYING OUT INVENTION

Figure 1:
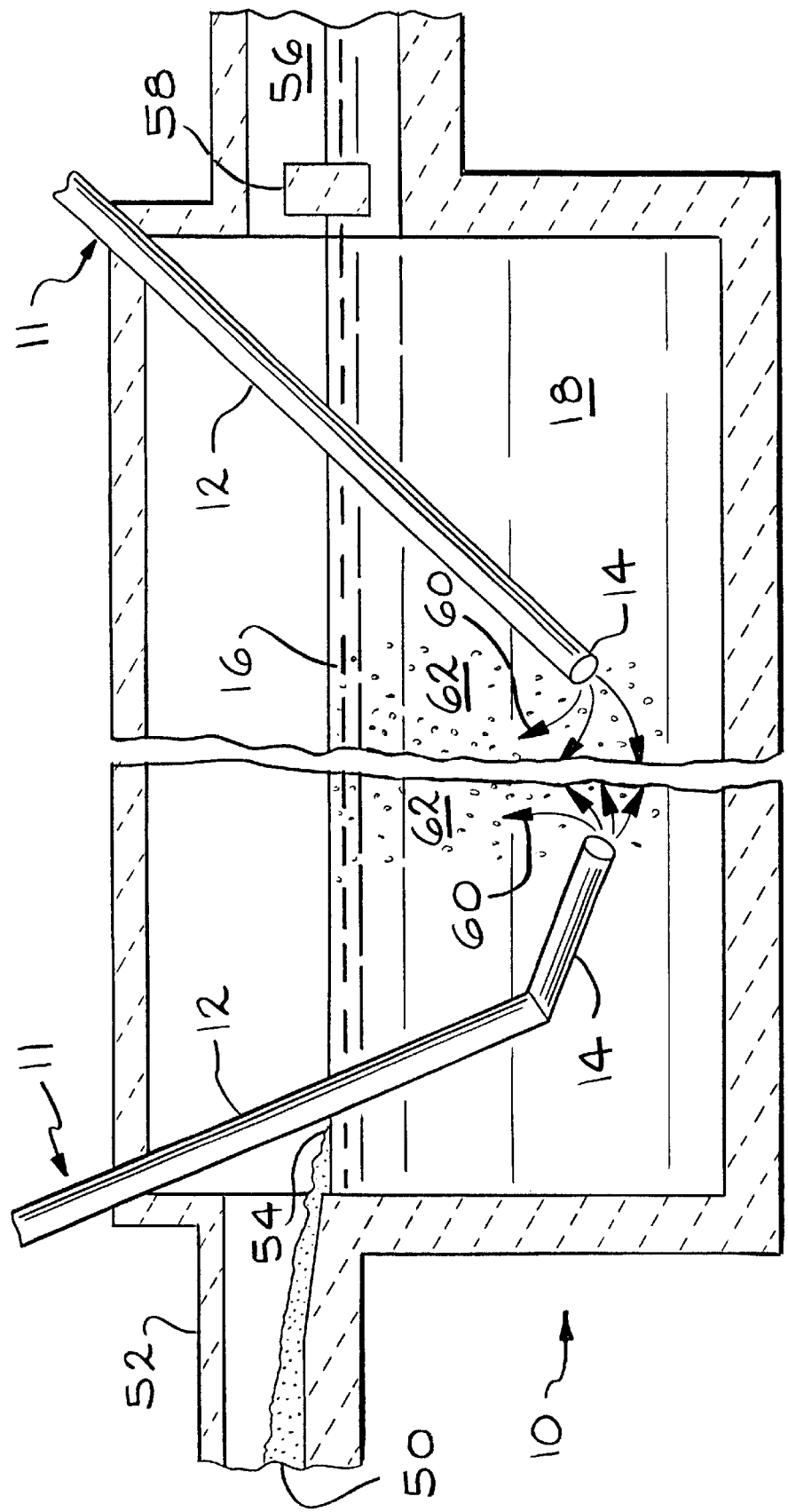
FIG. 1 is a side view of the submerged combustion melter of this invention.

FIG. 1 shows a furnace 10 and oxy fuel burner assembly 11. Assembly 11 comprises water cooled supply arm 12 with the burner nozzle 14 below the upper surface of the molten material. Assembly 11 is cooled typically by a water cooling jacket. Assembly 11 also typically includes an insulation sleeve jacket. FIG. 1 shows a straight arm with one supply arm 12 and nozzle 14 at a sharp angle from vertical and one burner 12 which forms a partial L shaped with the nozzle 14. If nozzle 14 is perpendicular to upper surface 16 of molten material 18 or at a shallow angle or parallel to surface 16, high volumes of combustion gas bubbles occur and open tunnels or chimneys raise up through molten material 18. This effect can be eliminated by the motion described in this specification. When assembly 11 is submerged and the high volume of combustion gases is perpendicular to surface 16, rotation or oscillation will not eliminate the problems of the prior art. When assembly 11 is submerged and the high volume of combustion gases is parallel or at a shallow angle (less than 5°) to surface 16, rotation or oscillation eliminates the problem of the prior art and transfer heat and kinetic energy to molten material 18.

While the oxy-fuel burners are shown in the prior art, the top down access and the angle used and the location of the burner nozzle away from the refractories is new. My adaptation of these burner assemblies and their use in the glass melting process are new. I can use the rotary burner of U.S. Pat. No. 5,630,713 in any invention. The burners of U.S. Pat.

Nos. 4,622,007; 3,260,587 and 3,237,922 also will work. The gases of these burners have a kinetic energy (velocity and mass) that I use for the beneficial moving of the molten material. These gases are a powerful pumping/stirring device as well as a source of heat. The angles I employ use these gases constructively, not destructively.

When the oxy-fuel burner assembly is above the surface of the molten material, the longitudinal axis of the gases forms an acute angle relative to the upper surface of the molten material. The axis of the gases is not perpendicular, nor is it parallel to the upper surface of the molten material. In short, this acute angle is greater than 0°, but less than 90°. Preferably, the acute angle ranges from 5° to 85°. Generally, the longitudinal axis of the gases is parallel to the longitudinal axis of the assembly's nozzle.

When the assembly is below the upper surface of the molten material, the angles I can employ generally are the same . When submerged, however, the axis of the gases can be parallel to the upper surface, but not perpendicular. Rotation or oscillation of the assembly allows the parallel orientation to work well in transferring the kinetic energy of the gases to the molten material.

In melters or furnaces 10 of this invention, the depth of emersion of assembly 11 can be varied when the furnace is in operation. One of the advantages is that an operator can remove assembly 11 hot. One also can use additional top fire burners with this invention. Moving assembly 11 with mechanical motion is one key to this invention. The motion can be some form of occilation such as rotating back and forth or 360° rotation. Assembly 11 can be used in a single zone melter, i.e. a tank depth and an emersion depth selected for complete mixing. Assembly 11 also can be used in a two-zone, melter. For example, assembly 11 can be above a quiet, unmixed depth of molten glass 18. Another key to this invention is that multiple assemblies 11 can be employed.

FIG. 1 also shows unmelted batch material 50 being fed to the upper surface 16 of molten material 18 at the back of furnace 10 through doghouse feeder 52. Batch 50 has a leading ledge 54. Molten material 18 exits the front of furnace 10 through chamber 56. Weir 58 helps refine the exiting molten material.

Figure 2:
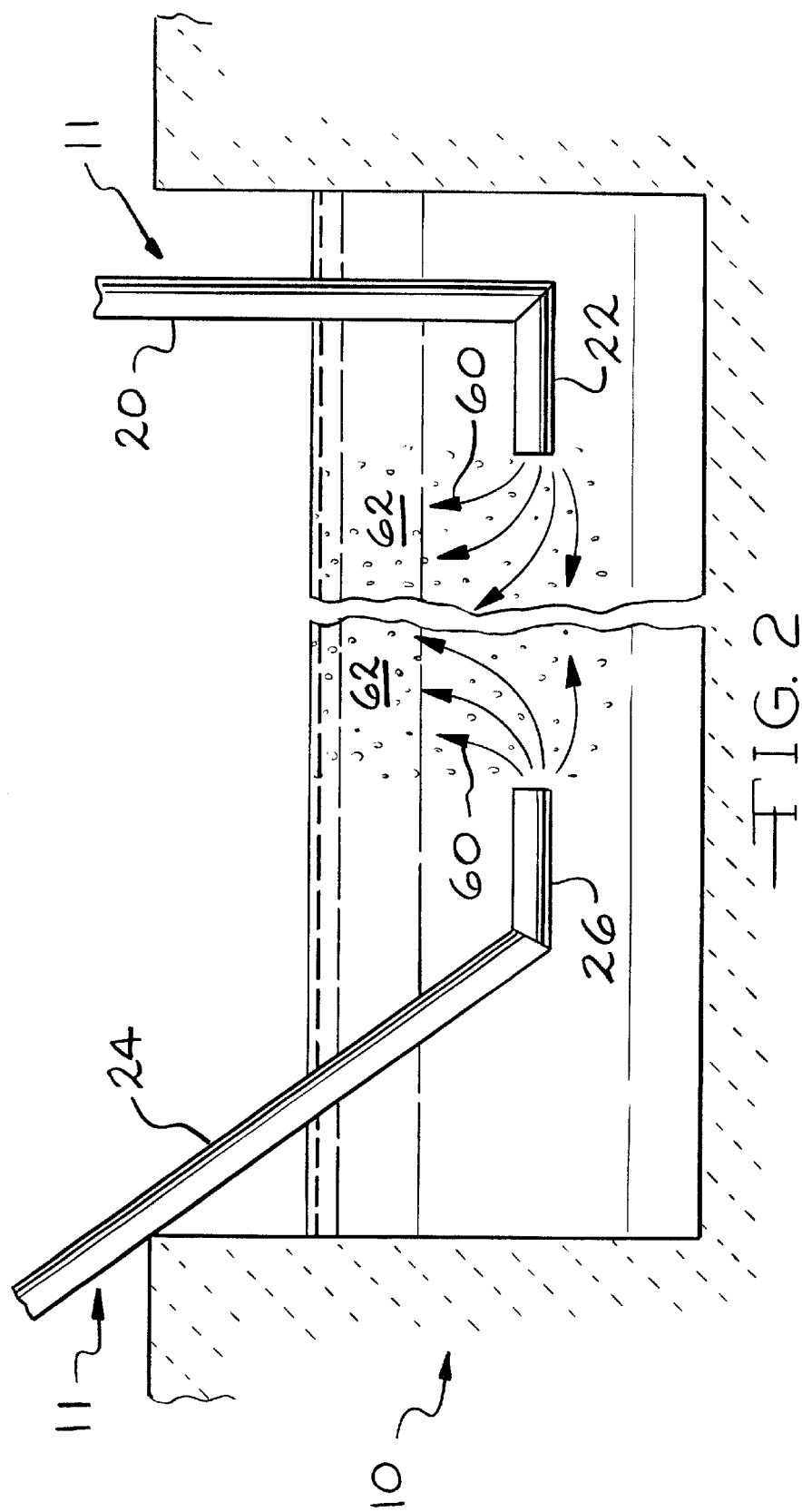
FIG. 2 shows burner assemblies similar in shape to the letter L.

FIG. 2 shows assembly 11 with supply arm 20 and nozzle 22 shaped like the letter L. Partial rotation of this burner is around the vertical axis of arm 20. FIG. 2 also shows supply arm 24 and nozzle 26 in a partial L shape. This assembly is suitable for back and forth oscillation. Care needs to be taken to prevent the nozzles from being too close to the side walls of a melter 10.

Figure 3:
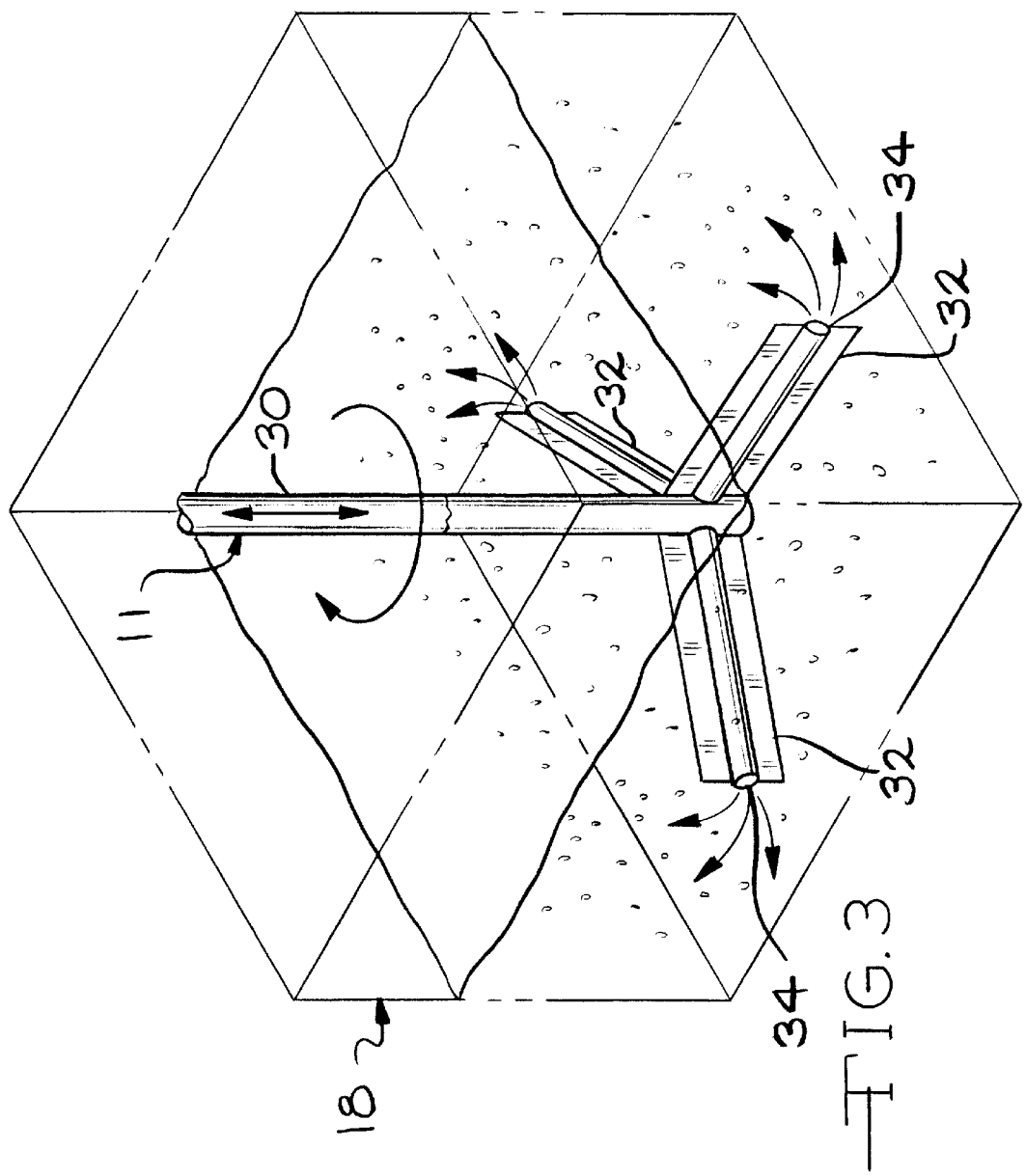
FIG. 3 shows a three bladed burner, stirrer assembly.

FIG. 3 shows another embodiment of this invention. Burner assembly 11 includes supply arm 30 with three bladed radial impellers 32 with multiple burner nozzles one or more at the end of each impeller 32. Again, 360° rotation or a back and forth rotation may be employed. Big flat blades can be utilized to enhance impellers 32 for efficient stirring. Not shown is a four bladed radial impeller with nozzles at the end of each of the four impellers. Any number of multiple nozzles may be employed.

Figure 4:
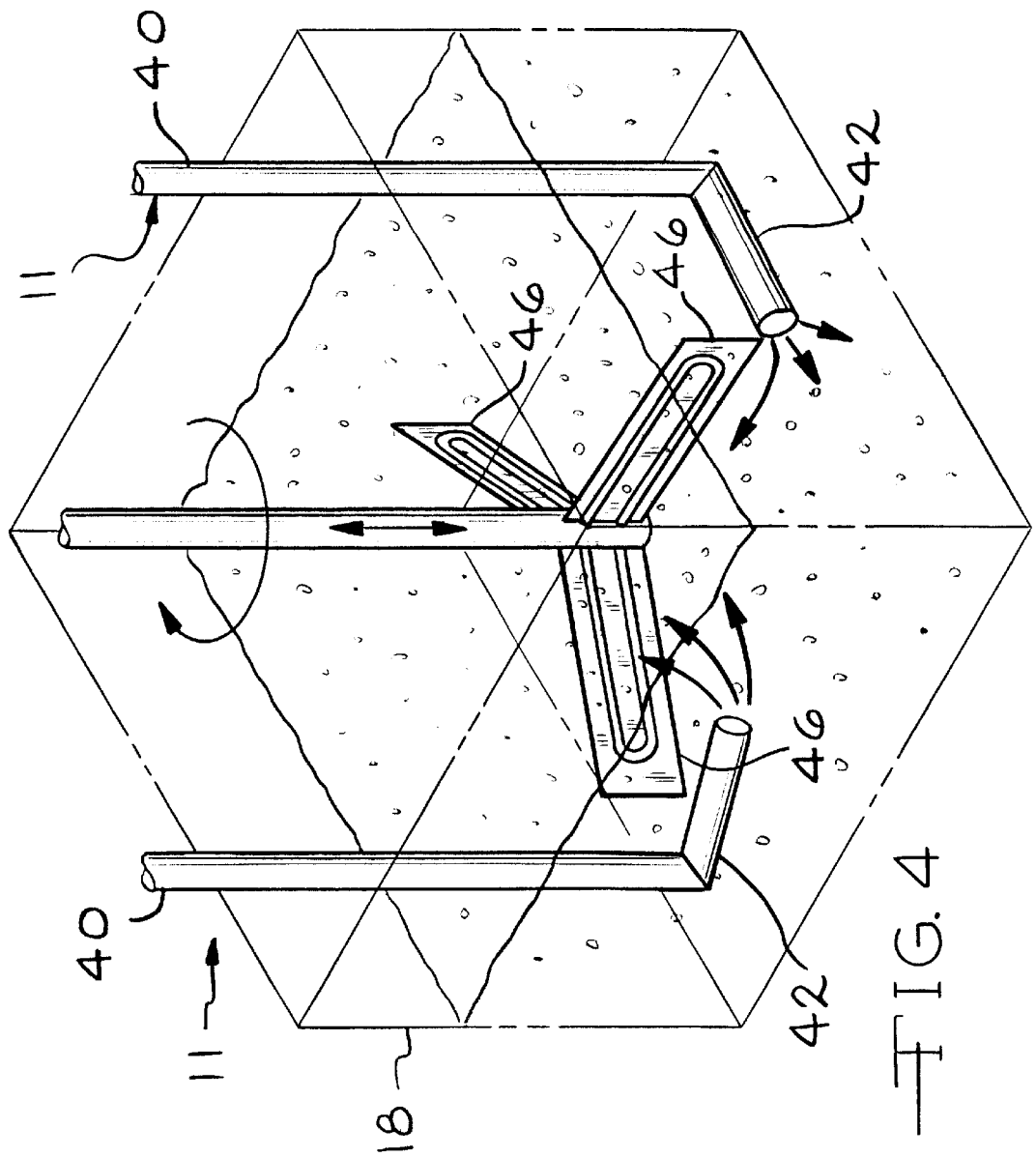
FIG. 4 shows a combination of submerged assemblies and separate impellers.

FIG. 4 shows a combination of stationary assemblies 11 with submerged arm 40 and nozzles 42 and separate water cooled impellers 46. In this embodiment, submerged assemblies 11 are off-set, e.g. L-shaped. In combination with multiple off-set assemblies 11, multiple bladed radial impellers 46 may be employed. Impellers 46 are located above assemblies 11.

Figure 5:
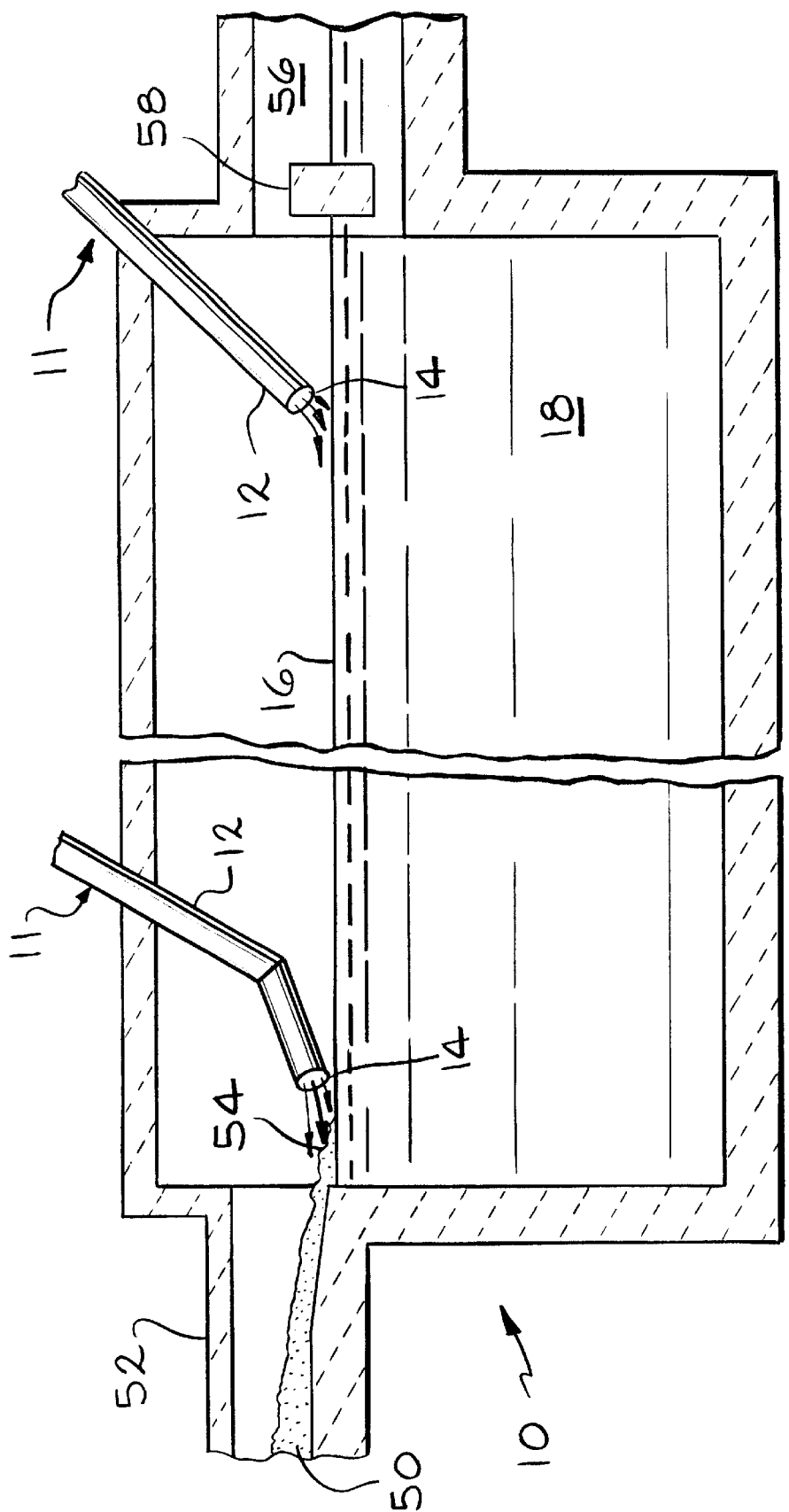
FIG. 5 shows the burner assemblies above the molten material.

FIG. 5 shows another embodiment of my invention where the oxy-fuel assembly is not submerged. In this embodiment, nozzle 14 forms an acute angle with upper surface 16 of molten material 18. Controlled surface flow of the glass and even splashing of molten material 18 is the key to this embodiment. The angle of incidence or impingement of the combustion stream determines the amount of kinetic energy transferred to the glass. At very low angles there will be minimum transfer of the kinetic energy of the glass stream.

In FIGS. 1–5, the combustion products are depicted by arrows 60 and bubbles 62.

In still another embodiment shown in FIG. 5, nozzle 14 is pointed at leading edge 54 of batch 52. Again, controlling the splashing of molten material 18 onto batch 52 at edge 54 is the key. Again, by careful selection of the burner melt angle, part of the kinetic energy of the combustion stream is transferred to the glass melt. The combined combustion stream and moving or splashed glass are directed towards the batch pile and away from the furnace refractories. In addition, the bulk flow of the super heated glass is driven under the batch blanket.

Figure 6:
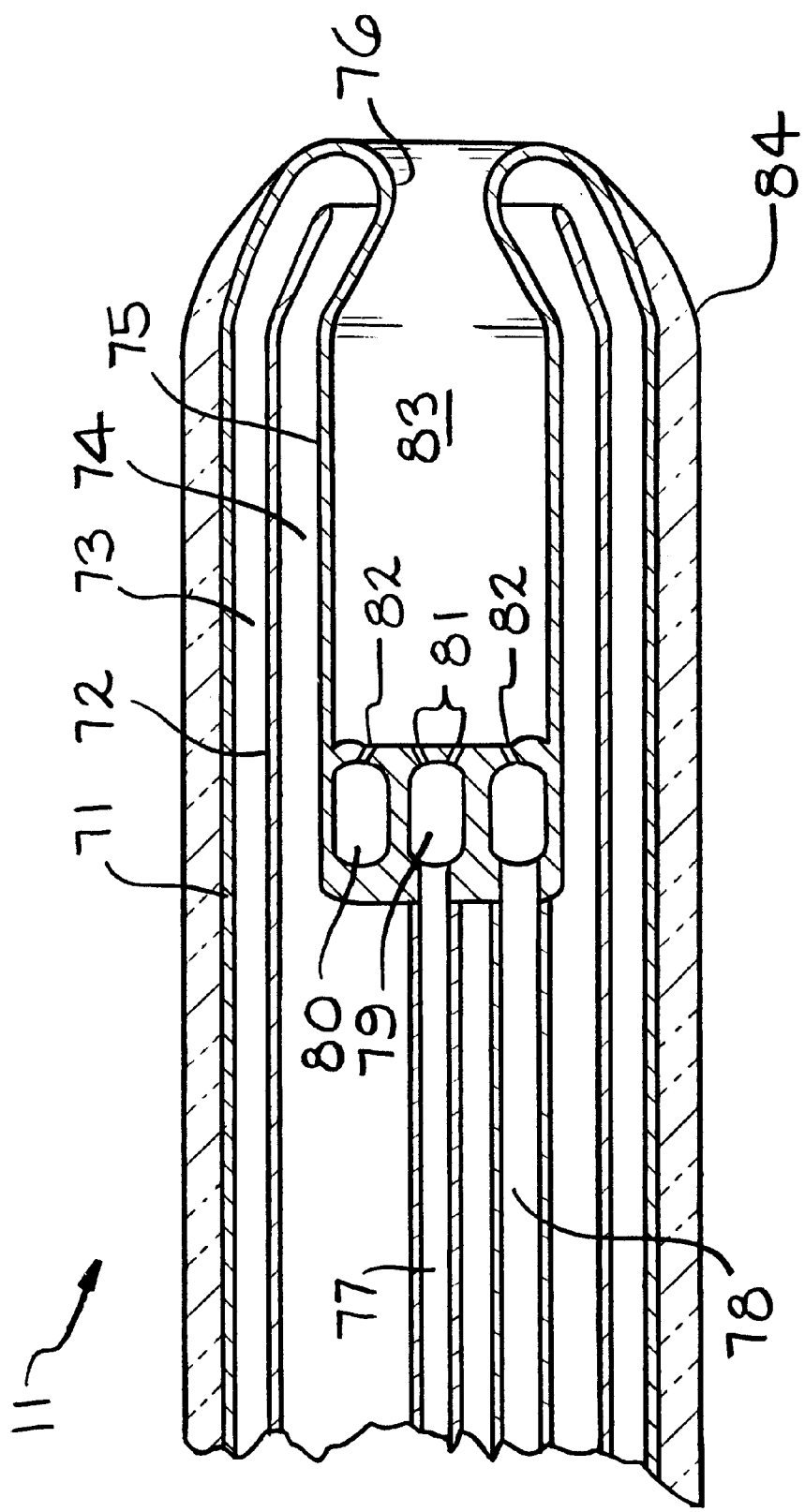
FIG. 6 shows the burner assembly is greater detail.

FIG. 6 shows assembly 11 in greater detail. The cooling chamber of this assembly includes outer wall 71 and inner wall 72. These wall form cooling water return passage 73 and supply passage 74. Inside these walls is combustion wall chamber 75. This wall defines combustion chamber discharge nozzle 76. The interior of assembly 11 includes fuel supply pipe 77 and oxygen supply pipe 78. These pipes open into fuel distribution chamber 79 and oxygen distribution chamber 80. Chamber 79 opens into gas discharge orifice 81 and chamber 80 opens into oxygen discharge orifice 82. Orifices 81 and 82 in turn open into combustion chamber 83. Insulation layer or jacket 84 circumscribes assembly 11. The material of wall chamber 75 is made of copper or other material with a high thermal conductivity. The remainder of assembly 11 can be stainless steel.

This invention uses oxy-fuel combustion in water cooled top-down submerged burners for melting vitreous materials or other high melting salts, slags and the like. The burner can be off-set from the downward tending supply column. The burner can be mechanically moved about to extend the length of the combustion path up through the molten material.

The mechanical motion is a rotation or partial rotation or oscillation of the gas-fuel-water cooling assembly with the burner off-set from the rotational axis at the bottom. Axial rotation needs an off-set nozzle, but oscillation can be used with a straight nozzle. Rotation, partial rotation or oscillation also can be through two or more planes rather than a single axial plane. The process may utilize multiple nozzles from a common downward tending supply column. The fluid motion resulting from combustion and burner rotation can be further enhanced by flat surfaces on the moving off-set burner nozzle arms. Another embodiment is a mechanical stirring device positioned and operated in such a manner that the stirred glass is used to break up the combustion chimney adjacent to the submerged burner, disperse the batch, and aid the mixing of the molten material.

The apparatus is a combustion energy supply consisting of a cooled downward tending supply column immersed in a vitreous melt with one or more burner nozzles. The apparatus has a combustion nozzle or nozzles. The apparatus may include the addition of insulating means between the glass and the water cooled shaft. The apparatus may have more than one arm. The design includes means of mechanically adjusting the immersion depth of the burner. The design may include a separate mechanical stirrer and separate means for imparting mechanical motion during use. The motion is a rotary motion about the supply column axis including occilation or 360° rotation. Top firing to supply additional heat as required and utilizing variable flow rates of combustion also are or part of this invention. Water cooling, insulating jackets and materials for the stirrers and impellers are the same as those for the oxy-fuel assemblies.

The apparatus may also include mechanical stirring independent from the burner assembly. The stirring speeds may vary in this and the other embodiments. Typically, the stirring speeds of will be 50 or 100 rpms or higher. Smaller stirrers may utilize speeds of over 400 rpms. However, other processing may require rotations as low as 10 rpms.

The fuel and oxygen supplied to the submerged combustion burners must, of course, be at a pressure sufficient to overcome the hydrostatic head of the melt above them. The pressure required in a particular case will depend upon the density of the melt, as well as its depth. By way of illustration, I found that a 2 foot (0.6 meter) depth of foamy molten soda-lime-silica glass requires a gas pressure over 2 pounds per square inch. Typically, the combustion chamber pressures are selected to make optimum use of the kinetic energy. Typically, these are over 5 psi. The amount of fuel supplied to the burners will depend upon the thermal requirements of the particular application, the heat content of the fuel used and the efficiency of the heat transfer to the molten material. Typically, soda-lime-silica batch often is processed from about 2,300° F. (1,260° C.) to about 2800° F. (1,540° C.). High levels of stirring often lowers the processing temperature. For a material such as flat glass, for which a somewhat oxidized condition is usually desired, an excess of oxygen beyond that required for combustion is preferably supplied to the burners. Other glasses may require a reduced condition. In this circumstance, less oxygen to the burners may be employed.

The melter may be any suitable melter such as those for forming a molten pool of glass for flat glass, fiber glass, bottles and the like. Scrap glass or cullet also may be used. Waste fiber glass especially may be advantageous because of the organics usually coated thereon. The heat source for the submerged combustion are fuels and oxygen mixed at the burner nozzle. They undergo combustion immediately prior to being injected into the molten fluid. Additional heat sources such as overhead combustion flames or electrical resistance heating may be employed in the melter. The combustion flames from these burners or additional burners or electric heating typically start up the melter. Once the molten pool forms, the submergible burners are emersed into the melt. Practical considerations require that the submerged burners be inserted or removed hot.

Given the up-flow in the region of gas release in the melter, the batch should be distributed to the down flow regions. Under higher melting and firing rates, the melt will be a foam and the batch will sink. Thus, the batch will start to melt before it is caught up in the combustion zone and blown out. It may be further advantageous to flatten and extend the surface area of the off-set burner arms in the form of an impeller to enhance batch dispersion and fluid flow. It is also possible to have stationary L or J shaped burners and use a water cooled impeller mixing device to break up the gas column and disperse the batch. Again the burners are top-down for easy repair and start up. Pulsed or variable flow rate combustion is another approach which can be used to reduce the continuous blow-thru chimney effect. This maximum flow rate can be greatly increased by the mechanical motion of the nozzle. Further, the mechanical movement of the burner nozzle extends and attenuates the hot gas path in the melt. This increases contact time and surface area for improved heat transfer and absorbs more the kinetic energy in the glass. This increases contact time as well. The movement and shape of the burners form a gas curtain rather than the chimney of the prior art.

In still another embodiment, directed specifically at sodium silicate glasses, sand can be preheated in a direct air-gas fired unit or by exhaust gases from the melter. The hot sand (heated at about 80% efficiency with air-gas) should be fed to a melter, highly stirred with oxy-gas heating (burners on stirrer blades or stationary burners plus stirrer), along with the soda ash (cold) because the stirrer will mix them all up anyway. Conventional unstirred melting requires that the batch be uniformly mixed to avoid segregation and mixed sand-soda ash can not be preheated significantly as it gets sticky. Thus, the combination of highly stirred melter and sand preheat minimizes energy and capital cost. The stirred melter could be oxy-fuel. Also, in the batch melting mode, the capability of raising the burner means it could be used for initial melting and then refining. For example, the assembly may be raised above the melt for refining the molten glass.

As discussed earlier, the gases of these burners have a kinetic energy (velocity and mass) that I use for the beneficial moving of the molten material. These gases are a powerful pumping/stirring device as sell as a source of heat. The following Example illustrates the kinetic energy I use in my invention.

EXAMPLE

The velocities of oxy-fuel burner assemblies range from subsonic (300 mph or less) to supersonic (800 mph). Three examples of these velocities are:

300 mph or 440 ft/sec.
600 mph or 880 ft/sec.
800 mph or 1173 ft/sec.

A typical oxy-fuel burner I employ is a two million BTU/hr. burner. The two million BTU burner at the above velocities develops the following kinetic energy expressed in ft/lbs/sec:

| 400 ft/sec | 356 ft-lbs/sec. |
| 800 ft/sec | 1424 ft-lbs/sec. |
| 1173 ft/sec | 2530 ft-lbs/sec. |

Transferring this energy to the molten material in a constructive way is the key to my invention.

I claim:

1. An apparatus for heating molten glass or glassy material comprising:
   a furnace containing molten material having an upper surface and at least one oxygen fuel burner assembly penetrating into the space contained in the furnace above the molten material; said assembly consisting of a water cooled supply shaft a combustion chamber and water cooled burner nozzle, wherein the burner nozzle develops a power associated with kinetic energy of over 250 ft-lbs/sec.; and wherein the burner nozzle penetrates the upper surface of the molten material thereby being submerged.

2. An apparatus according to claim 1 including a separate mechanical stirring device used in conjunction with the at least one burner assembly.

3. An apparatus according to claim 2 including means to oscillate, partially rotate, rotate or conically move the stirring device.

4. An apparatus according to claim 1 wherein the nozzle has the shape of an impeller blade.

5. An apparatus for heating a body of molten glass or glassy material comprising:
  a furnace containing molten material wherein the molten material has an upper surface; and
  at least one submerged, oxygen-fuel burner assembly penetrating this surface and having a combustion chamber and at least one water cooled nozzle having a longitudinal axis wherein the nozzle is beneath the upper surface of the molten material, wherein the burner assembly develops a power associated with kinetic energy of over 250 ft-lbs/sec.

6. An apparatus according to claim 5 including combustion products having a longitudinal axis, the combustion products being discharged from the nozzle wherein the longitudinal axis of the combustion products forms an acute angle with the upper surface of the molten material, the acute angle being less than 90°.

7. An apparatus according to claim 6 wherein the acute angle ranges from 50° to 85°.

8. An apparatus according to claim 6 wherein the longitudinal axis of the nozzle essentially is parallel to the longitudinal axis of the combustion products.

9. An apparatus according to claim 6 wherein the longitudinal axis of the combustion products is parallel to the upper surface of the molten material.

10. An apparatus according to claim 5 wherein the assembly has a supply arm with an axis and wherein the nozzle and supply arm are in a straight line with the axis.

11. An apparatus according to claim 5 wherein the furnace has a top and the assembly is a top-entering assembly.

12. An apparatus according to claim 5 wherein the assembly is L-shaped and the nozzle is parallel to the upper surface of the molten material.

13. An apparatus according to claim 5 wherein the assembly has more than one nozzle.

14. An apparatus according to claim 5 wherein the assembly has a longitudinal axis and the assembly includes a means for rotating the assembly about the longitudinal axis of the assembly.

15. An apparatus according to claim 14 wherein the assembly includes at least one impeller blade.

16. An apparatus according to claim 5 wherein at least one nozzle of the assembly extend from the at least one impeller blade.

17. An apparatus according to claim 5 wherein the furnace has at least one impeller separate from the burner assembly wherein the impeller extends into the body of molten material.

18. An apparatus according to claim 5 wherein the burner assembly forms an acute angle with the upper surface of the molten material and the at least one nozzle is parallel to the upper surface.

19. An apparatus according to claim 5 wherein the burner assembly is perpendicular to the upper surface of the molten material an the at least one nozzle is parallel to the upper surface.

20. An apparatus according to claim 14 including means for rotating, partially rotating or oscillating the assembly about the longitudinal axis of the assembly.

21. An apparatus according to claim 14 including means for rotating, partially rotating or oscillating through two or more planes.

22. A process for heating molten material and transferring kinetic energy thereto comprising the steps of:
  providing a furnace containing molten glass or glassy material wherein the molten material has an upper surface;
  providing at least one oxygen-fuel burner assembly having a combustion chamber and at least one water cooled nozzle at a point above the upper surface of the molten material;
  developing in the combustion chamber combustion products having a power associated with kinetic energy of over 250 ft-lbs/sec; and
  discharging from the nozzle the combustion products having a longitudinal axis wherein the combustion products impinge the upper surface of the molten material from a point above the upper surface of the molten material, the axis of the combustion products forming an acute angle with the upper surface, the acute angle being greater than 0° and less than 90°.

23. A process for heating molten material and transferring kinetic energy thereto comprising the steps of:
  providing a furnace containing molten glass or glassy material wherein the molten material has an upper surface;
  providing at least one submerged, oxygen-fuel burner assembly penetrating this surface and having a combustion chamber and at least one water cooled nozzle having a longitudinal axis wherein the nozzle is beneath the upper surface of the molten material;
  developing in the combustion chamber combustion products having a power associated with kinetic energy of over 250 ft-lbs/sec; and
  discharging from the nozzle the combustion products having a longitudinal axis wherein the combustion products discharge beneath the upper surface of the molten material, the axis of the combustion products forming an acute angle with the upper surface, the acute angle being less than 90°.

24. A process for heating molten material and transferring kinetic energy thereto comprising the steps of:
  providing a furnace containing molten glass or glassy material wherein the furnace has a structure and the molten material has an upper surface;
  providing at least one oxygen-fuel burner assembly having a combustion chamber and at least one water cooled nozzle at a point above the upper surface of the molten material;
  developing in the combustion chamber combustion products having a power associated with kinetic energy of over 250 ft/lbs/sec; and
  discharging from the nozzle the combustion products having the kinetic energy, wherein the kinetic energy is released in or above the molten material at a point removed from the furnace structure, thereby pneumatically stirring the molten material with the kinetic energy of the combustion products.

25. A process according to claim 24 including the step of mechanically stirring the molten material simultaneously with the pneumatically stirring from the kinetic energy of the combustion products.

* * * * *

UNITED STATES PATENT AND TRADEMARK OFFICE
CERTIFICATE OF CORRECTION

PATENT NO. : 6,357,264 B1
DATED : March 19, 2002
INVENTOR(S) : Raymond S. Richards It is certified that error appears in the above-identified patent and that said Letters Patent is hereby corrected as shown below:

<u>Column 7,</u>
Line 21, please correct "50°" to read -- 5° --.

Signed and Sealed this

Third Day of September, 2002

Attest:

JAMES E. ROGAN
Attesting Officer    Director of the United States Patent and Trademark Office